(12) United States Patent
Li et al.

(10) Patent No.: US 11,787,034 B2
(45) Date of Patent: Oct. 17, 2023

(54) POWER HEAD AND OUTDOOR POWER EQUIPMENT USING THE SAME

(71) Applicant: Globe (Jiangsu) Co., Ltd., Changzhou (CN)

(72) Inventors: Shuhua Li, Changzhou (CN); Fei Kan, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 40 days.

(21) Appl. No.: 17/513,921

(22) Filed: Oct. 29, 2021

(65) Prior Publication Data

US 2022/0134531 A1 May 5, 2022

(30) Foreign Application Priority Data

| | | |
|---|---|---|
| Nov. 2, 2020 | (CN) | 202011202800.3 |
| Nov. 2, 2020 | (CN) | 202022489134.8 |
| Dec. 4, 2020 | (CN) | 202011401018.4 |
| Dec. 4, 2020 | (CN) | 202022873438.4 |

(51) Int. Cl.
| | |
|---|---|
| *H02K 5/04* | (2006.01) |
| *E01H 5/09* | (2006.01) |
| *H02K 5/00* | (2006.01) |
| *B25F 5/00* | (2006.01) |
| *H02K 5/20* | (2006.01) |
| *H02K 9/02* | (2006.01) |
| *H02K 11/00* | (2016.01) |

(52) U.S. Cl.
CPC ............. *B25F 5/008* (2013.01); *E01H 5/098* (2013.01); *H02K 5/207* (2021.01); *H02K 9/02* (2013.01); *H02K 11/0094* (2013.01)

(58) Field of Classification Search
CPC .......... B25F 5/008; H02K 5/207; H02K 9/02; H02K 11/0094; E01H 5/098
USPC .......................................................... 310/91
See application file for complete search history.

(56) References Cited

U.S. PATENT DOCUMENTS

| | | | | |
|---|---|---|---|---|
| 2,478,829 | A * | 8/1949 | Lechtenberg | F04D 29/703 |
| | | | | 416/247 R |
| 2,930,322 | A * | 3/1960 | Spencer | F15B 1/26 |
| | | | | 222/333 |
| 11,296,576 | B2 * | 4/2022 | Schulenberg | H02K 5/22 |

(Continued)

FOREIGN PATENT DOCUMENTS

| | | | | |
|---|---|---|---|---|
| CN | 211353155 | * | 8/2020 | ............. A01D 75/18 |
| EP | 3648315 | A1 | 5/2020 | |
| EP | 3648315 | A4 * | 6/2020 | ............... H02K 5/00 |

OTHER PUBLICATIONS

English machine translation, Yu CN 211353155 (Year: 2020).*

*Primary Examiner* — Burton S Mullins

(57) ABSTRACT

The disclosure provides a power head and an outdoor power equipment using the same. The power head includes a housing assembly, a motor assembly and a battery pack assembly. The housing assembly includes a first housing and a second housing. The first housing and the second housing defines a housing space. The motor assembly is arranged in the housing space. The motor assembly includes a motor. One end of an output shaft of the motor extends to outside of the housing assembly. The battery pack assembly is arranged inside the housing space. The battery pack assembly supplies power for the motor assembly.

20 Claims, 13 Drawing Sheets

(56) References Cited

U.S. PATENT DOCUMENTS

| | | | | |
|---|---|---|---|---|
| 2008/0038073 A1* | 2/2008 | Paolicelli | ............... | B25F 3/00 |
| | | | | 408/99 |
| 2011/0094129 A1* | 4/2011 | Rowe | ............... | E01H 5/045 |
| | | | | 37/246 |
| 2017/0271939 A1* | 9/2017 | Kaneko | ............... | H02K 5/10 |
| 2018/0056496 A1* | 3/2018 | Rubens | ............ | B23K 26/0096 |
| 2018/0331597 A1* | 11/2018 | Schulenberg | ...... | H02K 11/0094 |
| 2020/0076337 A1* | 3/2020 | Abbott | ............... | H02K 11/0094 |
| 2020/0196522 A1* | 6/2020 | Feng | ............... | A01D 34/78 |
| 2021/0140130 A1* | 5/2021 | Gallagher | ............ | H02K 7/116 |
| 2021/0169001 A1* | 6/2021 | Xiao | ............... | A01D 34/78 |
| 2021/0169007 A1* | 6/2021 | Xiao | ............... | A01D 34/81 |
| 2021/0400878 A1* | 12/2021 | Vines | ............... | H02K 7/14 |
| 2022/0166162 A1* | 5/2022 | Matsunaga | ........ | H02K 11/0094 |

\* cited by examiner

US 11,787,034 B2

POWER HEAD AND OUTDOOR POWER EQUIPMENT USING THE SAME

CROSS REFERENCE TO RELATED APPLICATION

The present application is based on, and claims the priority from, Chinese application number CN202011401018.4, filed on Dec. 4, 2020, CN202022873438.4, filed on Dec. 4, 2020, CN202011202800.3, filed on Nov. 2, 2020 and CN202022489134.8, filed on Nov. 2, 2020, the disclosure of which is hereby incorporated by reference herein in its entirety for all purposes.

TECHNICAL FIELD

The disclosure relates to the technical field of outdoor power equipment, and particularly relates to a power head and an outdoor power equipment using the power head.

BACKGROUND

At present, engines are mostly used in outdoor power equipment or garden tools, which are inconvenient to control, noisy, serious in pollution, and cause potential safety hazards in gasoline storage. Batteries are currently the most widely used clean energy. With the continuous improvement of battery capacity, the battery life will gradually exceed the single fuel consumption time of the fuel engine. Power heads with batteries or outdoor power equipment driven by power heads are very promising. However, the conventional power head has complex structure, inconvenient assembly, and poor heat dissipation. In view of this, it is indeed necessary to provide a power head driven by a battery to solve the above-mentioned problems.

SUMMARY

The disclosure provides a power head and an outdoor power equipment using the power head. The power head of the disclosure is energy-saving and environmentally friendly. It has a simple structure. It is convenient to assemble and has a good heat dissipation effect.

The disclosure provides a power head, the power head is used to output power. The power head includes a housing assembly, a motor assembly and a battery pack assembly. The housing assembly includes a first housing and a second housing, the first housing and the second housing defining a housing space. The motor assembly is arranged in the housing space. The motor assembly includes a motor. One end of an output shaft of the motor extends to outside of the housing assembly. The battery pack assembly is arranged inside the housing space. The battery pack assembly supplies power for the motor assembly.

The disclosure further provides an outdoor power equipment. The outdoor power equipment includes a main body, a working assembly connected with the main body, a traveling assembly connected with the main body, and a power head mounted on the main body. The power head includes a housing assembly, a motor assembly and a battery pack assembly. The housing assembly includes a first housing and a second housing, the first housing and the second housing defining a housing space. The motor assembly is arranged in the housing space. The motor assembly includes a motor. One end of the output shaft of the motor extends to outside of the housing assembly. The battery pack assembly is arranged inside the housing space. The battery pack assembly supplies power for the motor assembly.

In summary, the power head of the disclosure integrates the motor assembly and the battery pack assembly to replace the engine, which reduces energy consumption, saves energy and protects environment. In addition, the power head of the disclosure has simple structure, convenient assembly and good heat dissipation effect.

DETAILED DESCRIPTION

Figure 1:
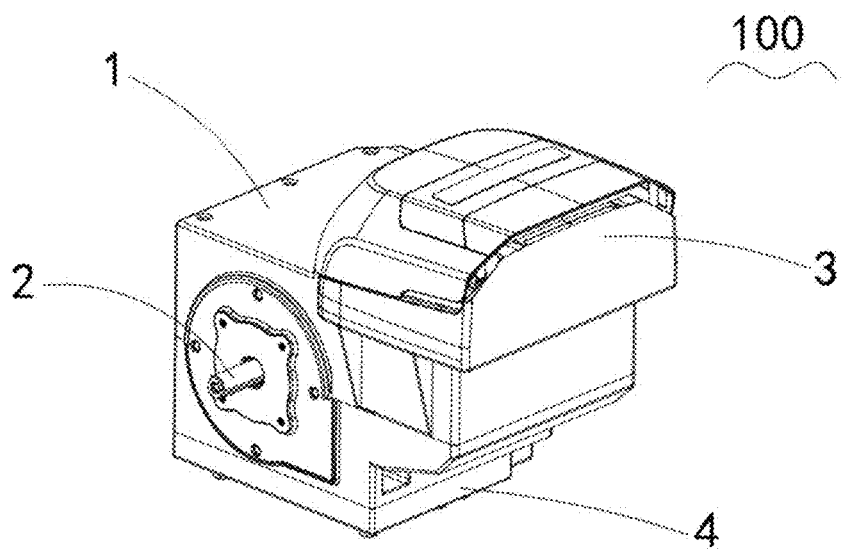
FIG. 1 is a structural schematic view of a power head of the disclosure.

The following describes the implementation of the disclosure through specific embodiments, and those skilled in the art can easily understand other advantages and effects of the disclosure from the content disclosed in this specification. The disclosure can also be implemented or applied through other different specific embodiments, and various details in this specification can also be modified or changed based on different viewpoints and applications without departing from the disclosure.

It should be noted that the illustrations provided in this embodiment only illustrate the basic idea of the disclosure in a schematic manner, so the figures only show assemblies related to the disclosure instead of the number, shape, and size drawing of the assemblies in actual implementation. In its actual implementation, the type, quantity, and ratio of each assembly can be changed at will, and its assembly layout type may also be more complicated.

The power head of the disclosure integrates the motor assembly and the battery pack assembly to replace the engine, which reduces energy consumption, saves energy and protects environment.

Please refer to FIG. 1 through FIG. 17, the disclosure provides a power head 100. The power head 100 includes a housing assembly 1, a motor assembly 2, a battery pack assembly 3 and a base 4.

Figure 2:
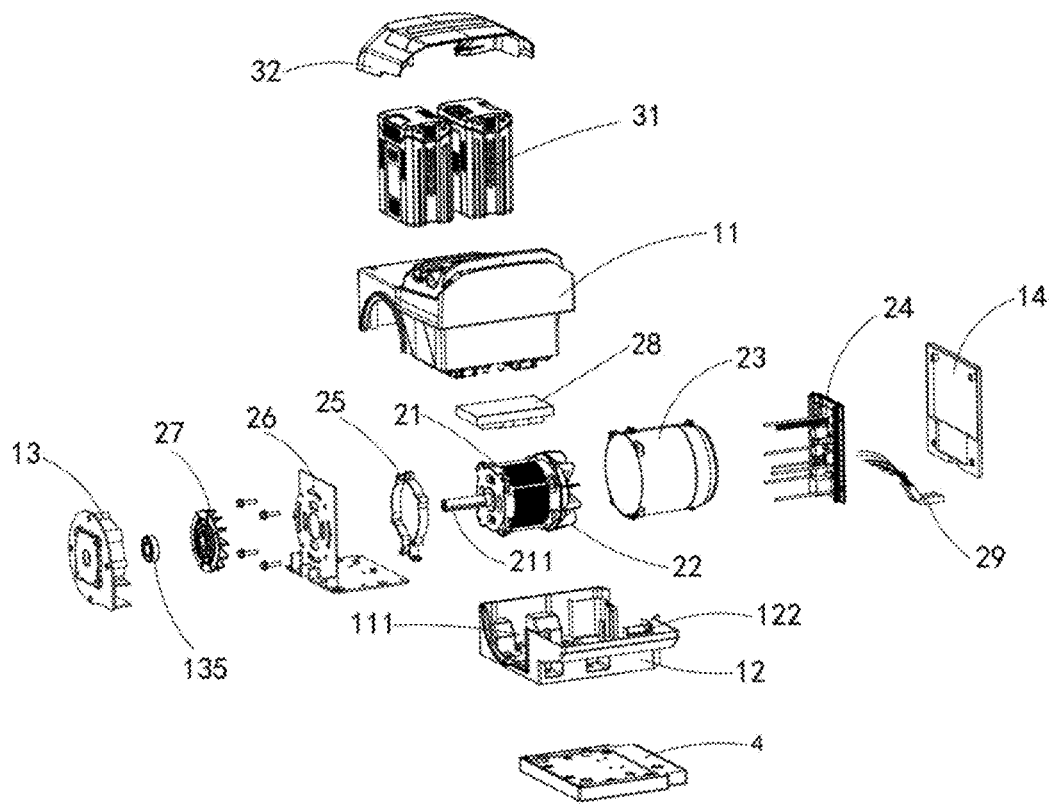
FIG. 2 is an exploded schematic view of the power head of the disclosure.

Please refer to FIG. 1 through FIG. 2, the housing assembly 1 can define a housing space for housing the motor assembly 2 and the battery pack assembly 3. The motor assembly 2 and the battery pack assembly 3 are arranged in the housing assembly 1, and the base 4 is arranged at the bottom of the housing assembly 1. The housing assembly 1 includes a first housing 11 and a second housing 12 mounted and matched with each together. In this embodiment, the first housing 11 and the second housing 12 are detachably connected, and the second housing 12 is arranged on the base 4. A first cavity 111 is defined between the first housing 11 and the second housing 12, and the motor assembly 2 may be arranged in the first cavity 111. The motor assembly 2 includes a motor 21. In this embodiment, the motor 21 can be arranged horizontally, which means that an output shaft 211 of the motor 21 is arranged horizontally. The output shaft 211 of the motor 21 extends to the outside of the housing assembly 1 to output power through the output shaft 211.

Figure 3:
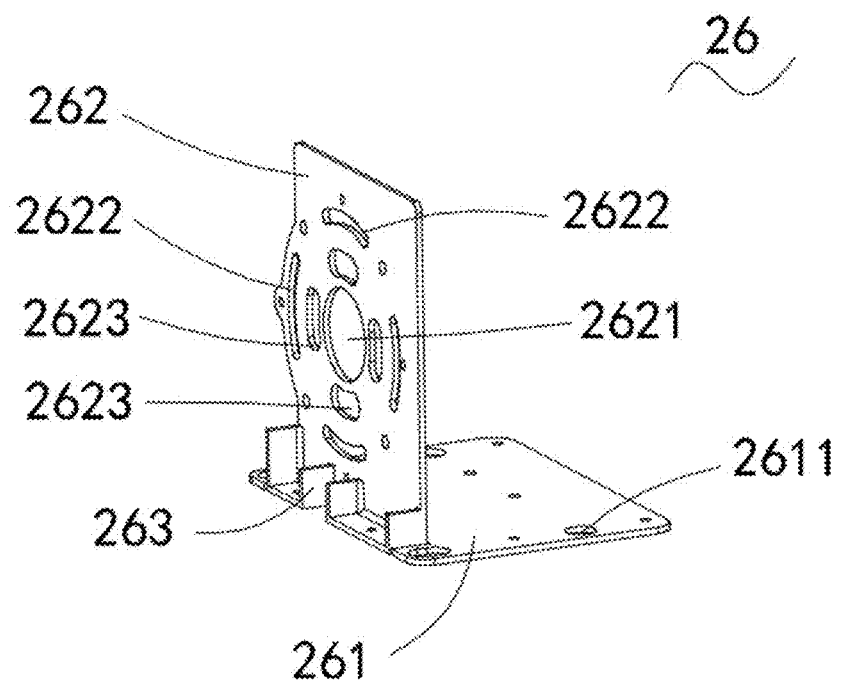
FIG. 3 is a structural schematic view of a mounting part of the power head of the disclosure.

Please refer to FIG. 2 through FIG. 3, the motor 21 is mounted in the first cavity 111 through a mounting part 26. The mounting part 26 in this embodiment may be an L-shaped metal plate. The mounting part 26 includes a first mounting portion 261 and a second mounting portion 262 perpendicularly connected with the first mounting portion 261. The mounting part 26 of this embodiment may be an integral structure, which means that the first mounting portion 261 and the second mounting portion 262 are an integral structure. The first mounting portion 261 and the second mounting portion 262 may also be two separate components, and the mounting part 26 may be assembled from these two separate components. The second mounting portion 262 is provided with a through hole 2621 for the output shaft 211 of the motor 21 to pass through, and the second mounting portion 262 is located in the first cavity 111. One end of the motor 21 provided with the output shaft 211 is connected with the second mounting portion 262. The motor assembly 2 of this embodiment may also be provided with a fixing bracket 25, and an end of the motor 21 away from the output shaft 211 is mounted and fixed by the fixing bracket 25. Of course, in other embodiments, the mounting part 26 may be with other shapes and structures, which is not limited here.

Figure 4:
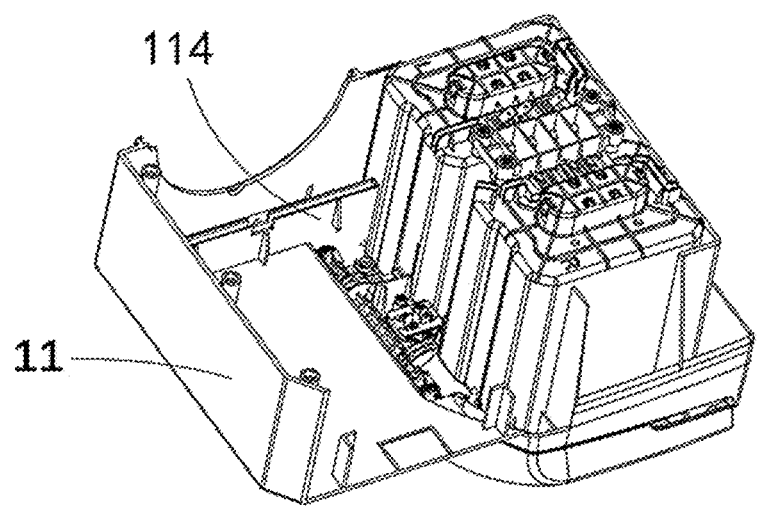
FIG. 4 is a structural schematic view of a first housing of the power head of the disclosure.

Please refer to FIG. 3 through FIG. 4, in order to enhance strength of the mounting part 26, the second mounting portion 262 may also be welded with a reinforcing rib 263 at an end close to the first mounting portion 261. In this way, the second mounting portion 262 is better supported, so that the second mounting portion 262 may better bear a pulling force of the motor 21. In addition, the first housing 11 of this embodiment is provided with a rib plate 114, and an upper end of the second mounting portion 262 is clamped and fixed by the rib plate 114 of the first housing 11, so that a fixing of the mounting part 26 is more reliable.

Figure 5:
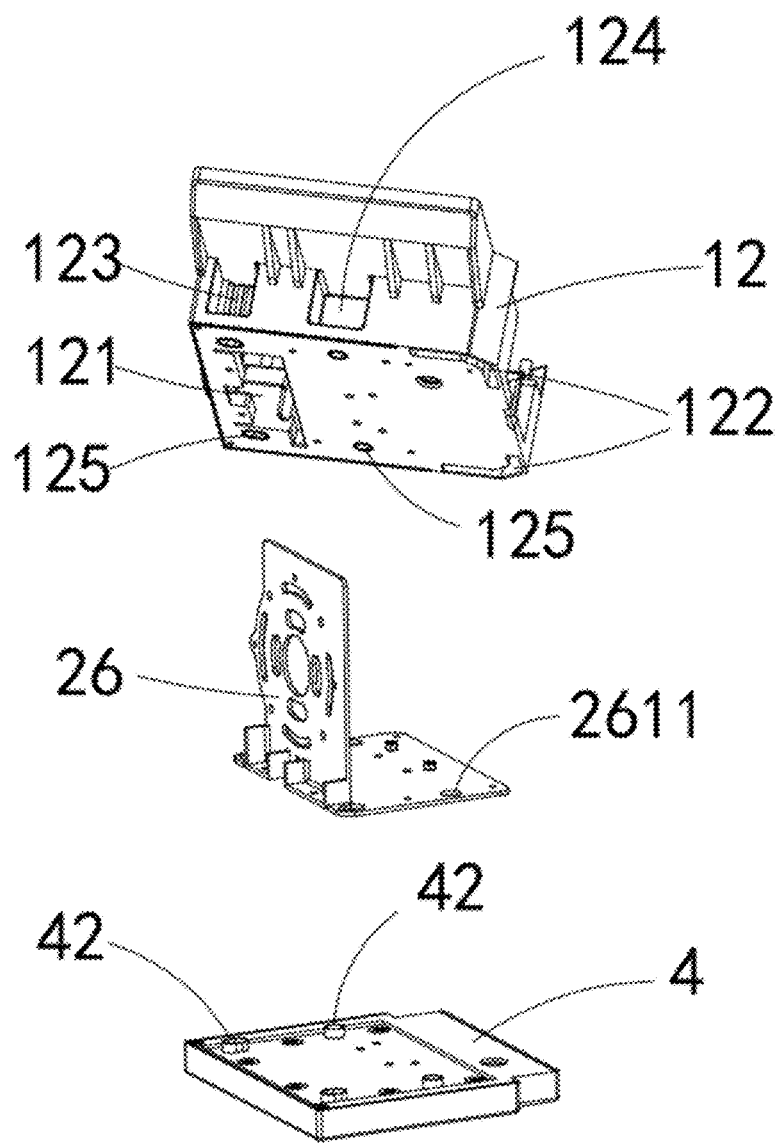
FIG. 5 is a structural schematic view of a bottom and a base of the power head of the disclosure.
Figure 6:
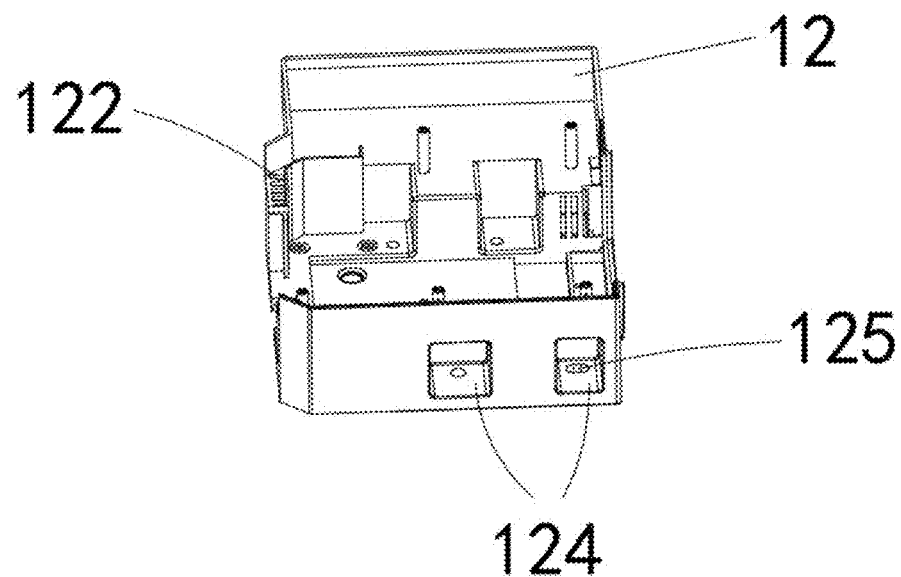
FIG. 6 is a structural schematic view of a second housing of the power head of the disclosure.
Figure 7:
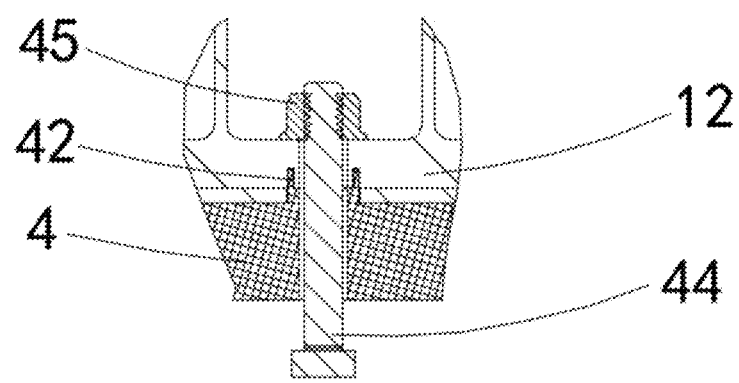
FIG. 7 is a schematic view of the sectional structure of a fixed connection among the second housing, the mounting part and the base of the power head of the disclosure.

Please refer to FIG. 5, the first mounting portion 261 of the mounting part 26 is clamped and arranged between the second housing 12 and the base 4, and the base 4 is provided with a mounting plane in contact with the first mounting portion 261. A position of the mounting plane corresponding to the first mounting portion 261 is recessed toward an inside of the base 4. After the first mounting portion 261 is placed on the base 4, an upper end surface of the first mounting portion 261 is aligned with the mounting plane of the base 4. When the first mounting portion 261 is clamped between the second housing 12 and the base 4, the first mounting portion 261 will not interfere with the second housing 12 and the base 4. The second housing 12 is provided with a notch 121 for the second mounting portion 262 to pass through, and the second mounting portion 262 enters the first cavity 111 through the notch 121.

Please refer to FIG. 5 through FIG. 8, in order to ensure that the mounting part 26 can reliably install and fix the motor 21, the mounting part 26 of this embodiment may be made of metal materials. And the first housing 11, the second housing 12, and the base 4 of this embodiment can be made of plastic materials to avoid the external charging of the power head 100, which is safer. In other embodiments of the disclosure, the first housing 11, the second housing 12, and the base 4 may also be made of other insulating materials. In this embodiment, the first mounting portion 261 is provided with a plurality of first mounting holes 2611, and the base 4 is provided with second mounting holes 41 at positions corresponding to the first mounting holes 2611. At the same time, two opposite sides of the second housing 12 are provided with a plurality of connection parts 124 recessed toward an inside of the second housing 12 at positions corresponding to the first mounting holes 2611, and the connection parts 124 may also be correspondingly provided with a third mounting hole 125. During assembly, bolts 44, nuts 45, etc. may be used to connect the second housing 12, the mounting part 26 and the base 4 together through the first mounting holes 2611, the second mounting holes 41, and the third mounting hole 125. And the entire power head 100 can be connected to an external equipment through these mounting holes. For example, the entire power head 100 is connected to an outdoor power equipment to drive the outdoor power equipment to work. It should be noted that in this embodiment, after the power head 100 is mounted on an external equipment, such as an outdoor power equipment, the output shaft 211 of the motor 21 extends in a horizontal direction, and the output shaft 211 may be parallel to a mounting plane of the power head 100 and the outdoor power equipment.

Please refer to FIG. 5 through FIG. 8, in this embodiment, first protruding parts 42 protruding toward the first mounting portion 261 may also be arranged at the positions of the second mounting holes 41 of the base 4, and the first protruding parts 42 may be with an annular structure for the bolts 44 to pass through. The first protruding parts 42 can be integrally formed with the base 4, which means that the first protruding parts 42 are also made of plastic material. In this embodiment, the first protruding part 42 is inserted into the second housing 12 through the first mounting hole 2611, and after inserted into the second housing 12, the first protruding part 42 surrounds the third mounting hole 125. When the bolt 44, etc. are used for assembly, the bolt 44 passes through the second mounting hole 41, the first protruding part 42, the first mounting hole 2611, and the third mounting hole 125 in sequence. Since the first protruding part 42 is arranged, and the first protruding part 42 is inserted into the second housing 12, when the second housing 12 is connected with the base 4, the first protruding part 42 can define an insulation structure. The generated creepage distance can prevent electric charges carried on the motor 21 from being transmitted to the bolt 44 through the mounting part 26, thereby preventing the electric charges from being transmitted to the external equipment connected with the power head 100. A structural arrangement of this embodiment enables the power head 100 to have a better insulation effect and higher safety. With the structural arrangement of this embodiment, the motor 21 is insulated to ensure the insulation requirements of the mounting holes of the power head 100.

Figure 8:
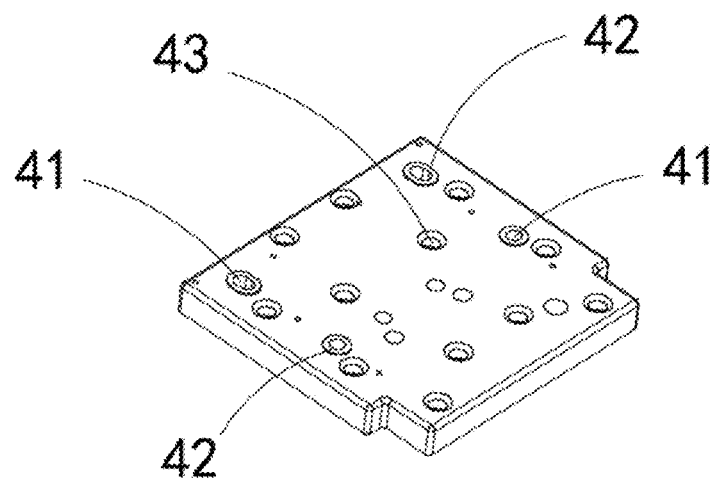
FIG. 8 is a structural schematic view of a mounting surface of the base of the power head of the disclosure.
Figure 9:
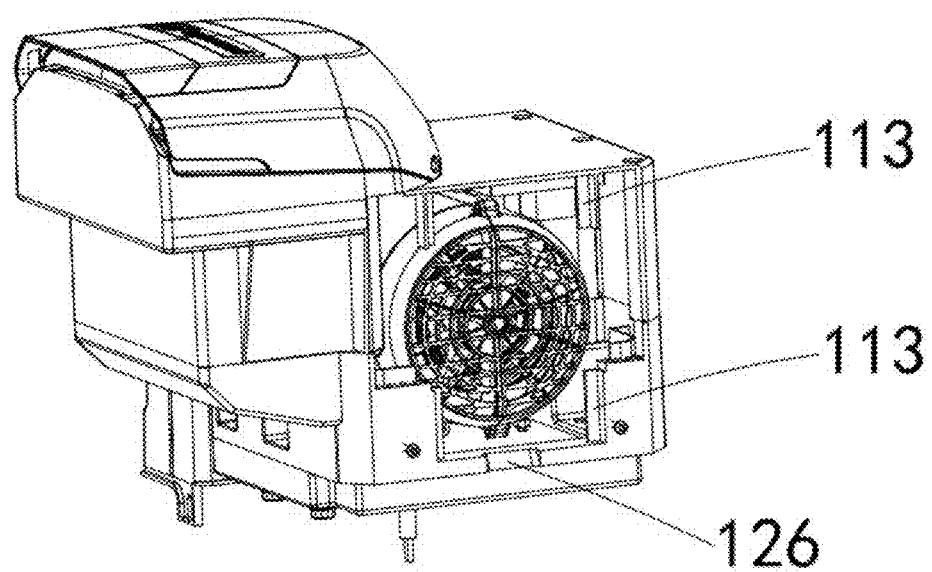
FIG. 9 is a partial structural schematic view of the power head of the disclosure.

Please refer to FIG. 8, the base 4 of this embodiment is also provided with a water leakage hole 43, and a side of the base 4 in contact with an external equipment is provided with a boss (not shown). In this way, when the power head 100 is mounted with the external equipment, the boss can define a certain gap between the power head 100 and the mounting plane of the external equipment. Water entering the housing assembly 1 can flow out from the gap between the power head 100 and the mounting plane of the external equipment through the water leakage hole 43, and the boss can reduce a contact area between the base 4 and the mounting plane of the external equipment, thereby reducing vibration transmission. The base 4 of this embodiment is also provided with a threading hole for connecting wires, data wires, etc. in the power head 100 to thread out for a connection with the external equipment. The threading hole is opened on the base 4. After the power head 100 is mounted on the external equipment, the connecting wires can directly enter the external equipment from the mounting plane in contact with the power head 100 of the external equipment, which can avoid large areas such as connection wires etc. from being exposed.

Please refer to FIG. 9 through FIG. 11 and FIG. 2, the housing assembly 1 of this embodiment further includes a first cover 13 and a second cover 14. The first cavity 111 mentioned above is surrounded and defined by the first housing 11, the second housing 12, the first cover 13 and the second cover 14. The first cover 13 and the second cover 14 are arranged on two opposite sides of the housing assembly 1. The second cover 14 is arranged on a side away from the output shaft 211 of the motor 21 to close the opening of the housing assembly 1. The motor assembly 2 of the power head 100 of this embodiment is further provided with a first control board 24, and the first control board 24 is connected with the battery pack assembly 3 and the motor 21 for control. The first housing 11 and the second housing 12 are provided with a supporting part 113, and the first control board 24 is clamped and arranged between the supporting part 113 and the second cover 14. When mounting the first control board 24, the first control board 24 is directly placed at the supporting part 113 first, and then the second cover 14 is mounted with the first housing 11 and the second housing 12. The first control board 24 is pressed against the supporting part 113. The first control board 24 in this embodiment is simple and convenient to assemble and disassemble, which is convenient for quick maintenance, replacement, and operation. In addition, the motor 21 of this embodiment is connected with a power cord 29, the power cord 29 passes through inside of the housing assembly 1 to outside of the housing assembly 1. In this embodiment, a side of the second housing 12 facing the second cover 14 is provided with an avoidance groove 126 for avoiding the power cord 29, and the avoidance groove 126 is located at a position below the first control board 24. The power cord 29 passes through a gap between a lower end surface of the first control board 24 and the second housing 12, and then threads out to the outside of the housing assembly 1 through the avoidance groove 126. The first control board 24 can play a role in positioning the power cord 29 to a certain extent, so that the power cord 29 can be arranged more neatly.

Figure 10:
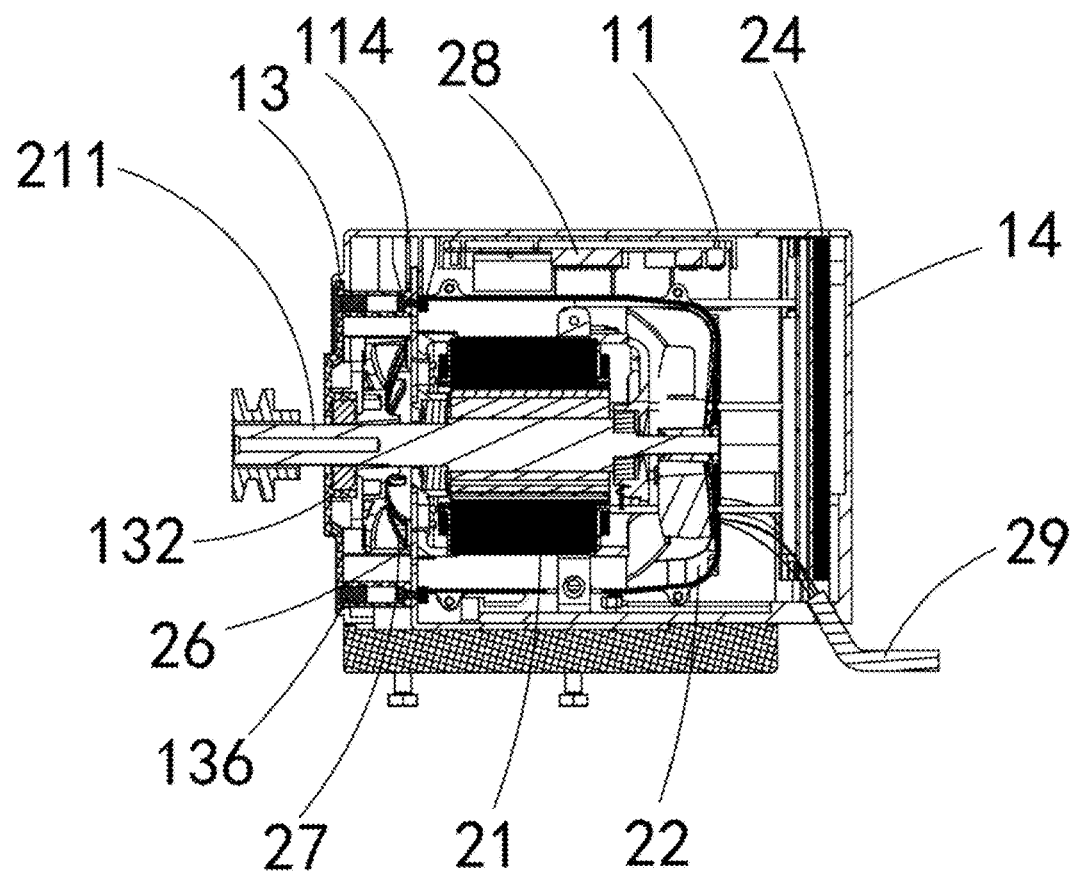
FIG. 10 is a schematic view of a side cross-sectional structure of the power head of the disclosure.
Figure 15:
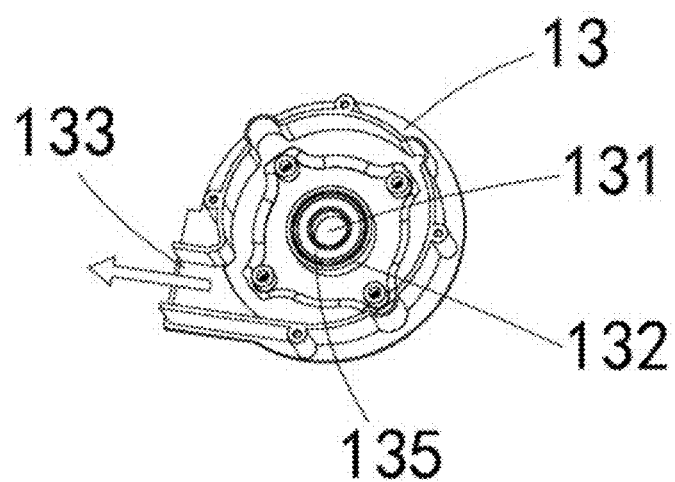
FIG. 15 is a structural schematic view of the first cover of the power head of the disclosure.

Please refer to FIG. 10 and FIG. 15, the first cover 13 of this embodiment is provided with an insulation plug 136 to avoid the risk of exposure of the screws used to fix the first cover 13 and improve the insulation of the power head 100. The first cover 13 is provided with a central hole 131 for the output shaft 211 of the motor 21 to pass through, and the first cover 13 is provided with a second protruding part 132 extending in a direction toward the second cover 14 at the position of the central hole 131. A bearing 135 is sleeved in the second protruding part 132, and the output shaft 211 of the motor 21 passes through an inner ring of the bearing 135. The bearing 135 can form a double bearing structure with a front end bearing inside the motor 21. So that when the motor 21 is started or overloaded and the output shaft 211 is subjected to a lateral tension due to variable load, the damage to the bearing inside the motor 21 by the lateral tension can be effectively reduced, which prolongs an working endurance of the bearing inside the motor 21, and solves the problem of frequent damage to the bearing inside the motor 21 for a long time.

Figure 11:
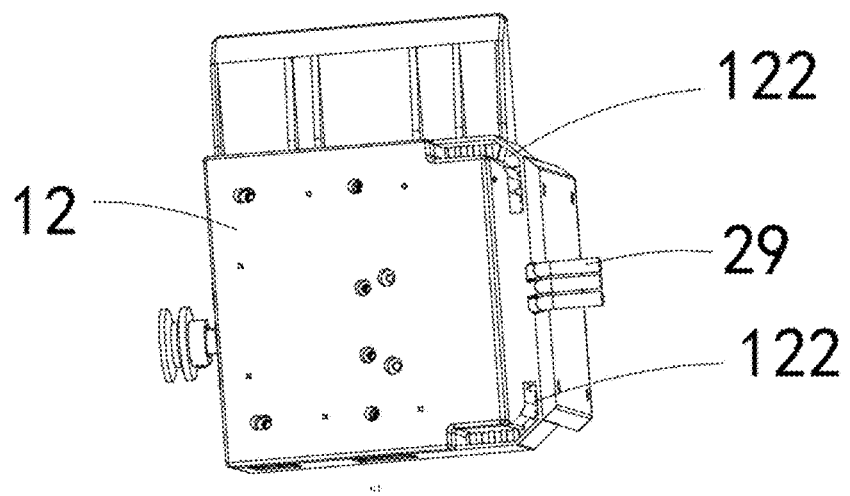
FIG. 11 is a schematic view of a bottom structure of the second housing of the power head of the disclosure.

Please refer to FIG. 10 and FIG. 11, a tail end of the motor 21 in this embodiment is provided with a first fan 22. The tail end of the motor 21 is an end of the motor 21 away from the output shaft 211, and the first control board 24 is located between the first fan 22 and the second cover 14. The housing assembly 1 is provided with an air inlet 122 and an air outlet 123. When the motor 21 is running, the first fan 22 is driven to rotate. Air is sucked into the housing assembly 1 from the air inlet 122 to dissipate heat for the components in the housing assembly 1, and then the air flows out of the housing assembly 1 from the air outlet 123. The air inlet 122 is arranged on the second housing 12, the air inlet 122 is opened downward, and the air inlet 122 is at a certain distance from a bottom end surface of the second housing 12. A plane where the air inlet 122 is located is not in a same plane as the bottom end surface of the second housing 12. The air inlet 122 defines a drop space with the bottom end surface of the second housing 12, which can effectively block an intrusion of external water vapor or dust. In order to increase an air inlet volume and a better heat dissipation, two air inlets 122 are arranged, and the two air inlets 122 are arranged on a side of the second housing 12 close to the second cover 14. The two air inlets 122 are located between the first control board 24 and the second cover 14. In this embodiment, the air outlet 123 is also arranged on the second housing 12. The air outlet 123 of this embodiment is arranged at a location of the connection part 124 and communicates with the connection part 124, and the air outlet 123 discharges gas in the housing assembly 1 through the connection part 124. An air outlet direction of the air outlet 123 may be spatially perpendicular to an air inlet direction of the air inlet 122. A location of the air outlet 123 is concealed, which can prevent water vapor, etc. from entering the housing assembly 1 from there.

Please refer to FIG. 10 through FIG. 15, the motor assembly 2 of this embodiment further includes a second fan 27 arranged on the output shaft 211 of the motor 21, the second fan 27 is located near the air outlet 123, and the second fan 27 is arranged between the second mounting portion 262 and the first cover 13. A rotation of the motor 21 synchronously drives the first fan 22 and the second fan 27 to rotate. After the first fan 22 rotates to enable air to enter the housing assembly 1, the air passes through the second mounting portion 262 and flows out toward the air outlet 123 through the second fan 27. This embodiment adopts a structure of double fans, which can enable the air to flow more smoothly and quickly and is beneficial to improve the heat dissipation effect. The motor assembly 2 of this embodiment further includes a casing 23 sleeved outside the motor 21. One end of the casing 23 is fixed on the second mounting portion 262, and the first fan 22 is covered inside the casing 23. The casing 23 may be made of metal material to enhance the heat dissipation capability. The casing 23 can gather the air entering the housing assembly 1 so that the air can better dissipate heat of the motor 21. After the air enters the casing 23, part of the air flows through an inside of the motor 21 for heat dissipation of an internal structure of the motor 21. Part of the air that does not enter the inside of the motor 21 flows through a gap between the motor 21 and the casing 23, which further dissipates heat of the motor 21 and improves a cooling effect on the motor 21.

Please refer to FIG. 10 through FIG. 15, the second mounting portion 262 is provided with an internal vent 2623 corresponding to a position of the motor 21, and air flowing through an inside of the motor 21 can flow toward the air outlet 123 through the internal vent 2623. The second mounting portion 262 is provided with an external vent 2622 corresponding to a gap between the motor 21 and the casing 23. The external vent 2622 is located at a periphery of the internal vent 2623, and the air flowing through the gap between the motor 21 and the casing 23 can flow toward the air outlet 123 through the external vent 2622. The external vent 2622 is arranged on the second mounting portion 262 around a periphery of a contact part of the motor 21 and the second mounting portion 262, and the external vent 2622 is located in an internal space of a connecting part of the casing 25 and the second mounting portion 262. The external vent 2622 is arranged on the second mounting portion 262 around an outer periphery of the motor 21. In other words, the external vent 2622 surrounds the periphery of the internal vent 2623, and the air flowing outside the motor 21 flows from the external vent 2622 to the air outlet 123.

Please refer to FIG. 10 through FIG. 15. In this embodiment, one side of the first cover 13 is attached to the second mounting portion 262, and the first cover 13 and the second mounting portion 262 are combined to define a volute-like structure. The volute-like structure is provided with a port 133, the port 133 communicates the above-mentioned air outlet 123 and has the same direction of air outlet 123, so as to guide the air entering between the first cover 13 and the second mounting portion 262 to the air outlet 123 through the port 133. A space between the first cover 13 and the second mounting portion 262 defines an air passage for air to flow, which means that the air passage for air to flow is defined in the volute-shaped structure. The port 133 is located at a tail end of the air passage, and the port 133 is located at the bottom of the first cover 13. An air outlet direction of the port 133 is the same as an air outlet direction of the air outlet 123. The second fan 27 is located between the first cover 13 and the second mounting portion 262, which means that the second fan 27 is located inside the volute-like structure. When the second fan 27 rotates, air between the first cover 13 and the second mounting portion 262 can be thrown out from the port 133. In this embodiment, the first cover 13 and the second mounting portion 262 are combined to define a volute-like structure, which enables the air to flow more quickly and smoothly.

Please refer to FIGS. 10 to 15, when the motor 21 is started, the first fan 22 rotates and sucks external air from outside of the housing assembly 1 into the housing assembly 1 through the air inlet 122. Since the first control board 24 is located between the first fan 22 and the second cover 14, the air entering the housing assembly 1 first flows through the first control board 24 for heat dissipation of the first control board 24. The air is sucked into the casing 23 under an action of the first fan 22 for heat dissipation of the motor 21 sufficiently. This part of the air passes through the internal vent 2623 and the external vent 2622 of the second mounting portion 262 under an action of the second fan 27, enters an area between the first cover 13 and the second mounting portion 262, finally flows through the port 133 of the first cover 13 to the air outlet 123 of the second housing 12 and is discharged under the action of the second fan 27. The power head 100 of this embodiment can smoothly and quickly dissipate heat of the first control board 24 and the motor 21, air flows smoothly, and the heat dissipation effect is good.

Figure 12:
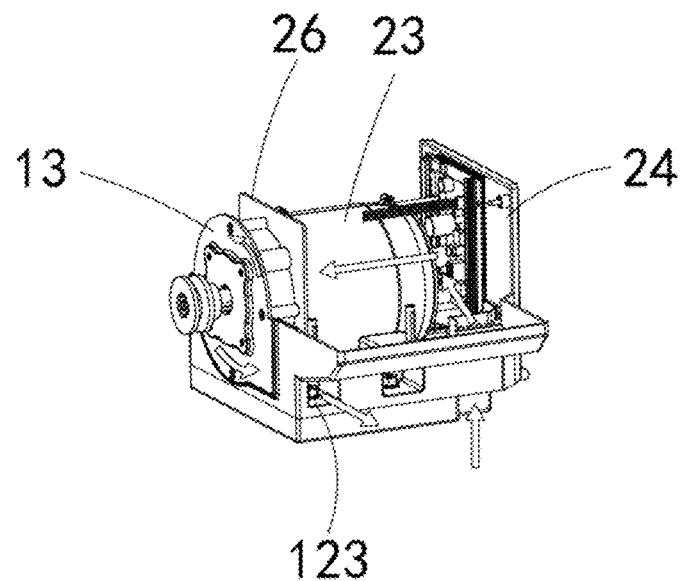
FIG. 12 is a schematic view of air flow of the power head of the disclosure.
Figure 13:
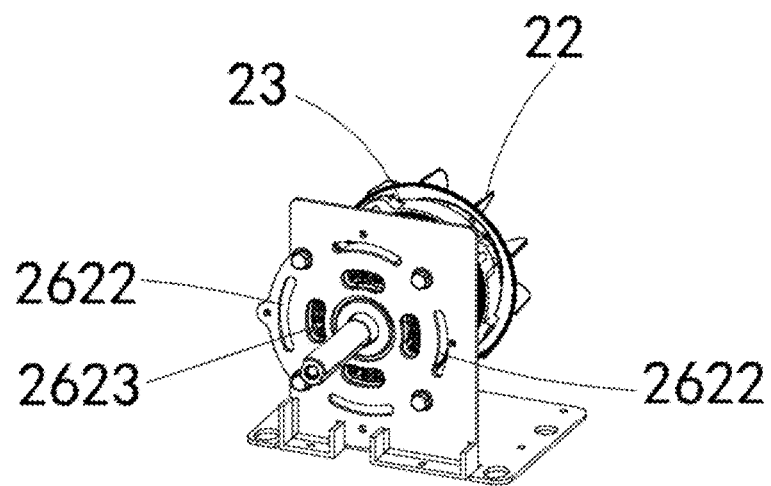
FIG. 13 is a structural schematic view of a motor assembly and the mounting part of the power head of the disclosure.
Figure 14:
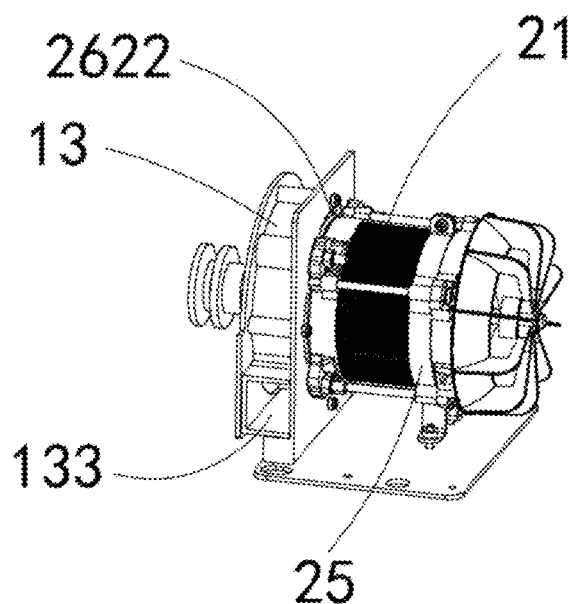
FIG. 14 is a structural schematic view of FIG. 13 with a first cover.

Please refer to FIG. 10 and FIG. 12, the power head 100 of this embodiment further includes a second control board 28. The second control board 28 is arranged in the housing assembly 1. The second control board 28 is fixed on the first housing 11 through snapping or screw fixing, and the second control board 28 is located on the upper side of the motor 21. The second control board 28 of this embodiment can be arranged in contact with the casing 23 for passive heat dissipation.

Figure 16:
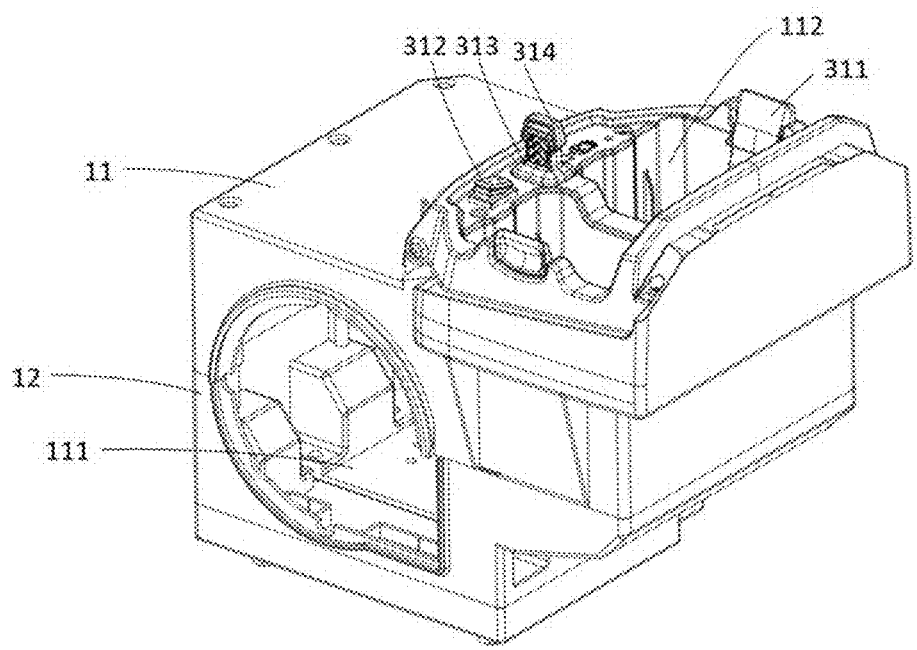
FIG. 16 is a structural schematic view of a first cavity and a second cavity of the power head of the disclosure.
Figure 17:
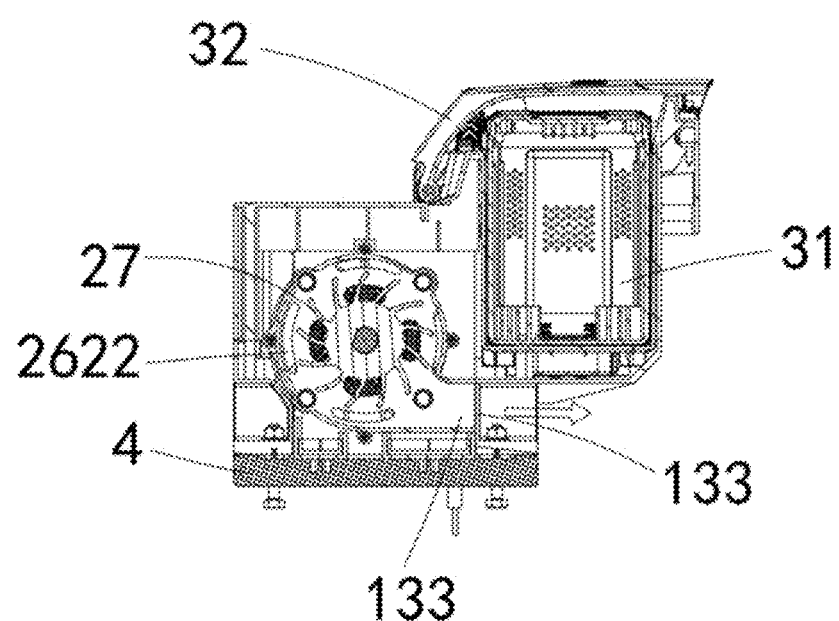
FIG. 17 is a schematic view of a cross-sectional structure of the power head of the disclosure.

Please refer to FIG. 16 and FIG. 17, the battery pack assembly 3 of this embodiment is preferably arranged vertically in the housing assembly 1. The housing assembly 1 of this embodiment is further provided with a second cavity 112 for housing the battery pack assembly 3. The second cavity 112 is arranged on the first housing 11, and the second cavity 112 may be arranged in a vertical direction with an opening facing upward. The battery pack assembly 3 includes at least one battery pack 31, and any combination of series and parallel can be performed between the battery packs 31. In this embodiment, when there are a plurality of battery packs 31, isolation plates may be arranged between the battery packs 31 for easy mounting. A button assembly 311 is arranged in the second cavity 112 for fixing or releasing the battery pack 31. After the battery pack 31 is placed in the second cavity 112, an insertion and removal direction of the battery pack 31 can be perpendicular to the output shaft 211 of the motor 21, and the battery pack 31 is located beside the motor 21, which means that the battery pack 31 is located in a vertical direction and the battery pack 31 is arranged on a side of the motor 21. When producing the first housing 11, the mold can be opened up and down, which enables a mold opening of the first housing 11 convenient and reduces cost of production and manufacturing. Moreover, vertical placement of the battery pack 31 facilitates an insertion and removal of the battery pack 31, and enables the battery pack 31 more reliably fixed in the first housing 11 under the action of its own gravity. In addition, placing the battery pack 31 on a side of the motor 21 allows the power head 100 of this embodiment to replace an engine. When in use, the power head 100 of this embodiment is mounted on a corresponding external equipment. Of course, in other embodiments, the battery pack assembly 3 can also be arranged in other directions, for example, the insertion and removal direction of the battery pack 31 and the output shaft 211 of the motor 21 are at a certain angle, which is not limited here.

Please refer to FIG. 16, an edge of the second cavity 112 is further provided with a switch 312 and a key hole 313. The key hole 313 is used to insert the key 314 to make the battery pack 3 conductive, and the switch 312 is used to start the power head 100.

Please refer to FIG. 17, in order to improve dustproof and waterproof effect, the second cavity 112 of this embodiment can also be rotatably connected with a battery cover 32. When the battery pack 31 is replaced or removed, the battery cover 32 can be opened, and at other time the battery cover 32 can be closed.

Please refer to FIG. 10 through FIG. 17. When the power head 100 of the disclosure is assembled, the mounting part 26 can be inserted into the second housing 12 first, and then the motor 21 and the casing 23 are fixed on the mounting part 26. The fixing bracket 25 is used for fixing the casing 23, and the second housing 12 connected with the mounting part 26 is connected to the base 4. After completing this part of assembly, the second control board 28 is mounted on the first housing 11. The second fan 27 is mounted on the output shaft 211 of the motor 21, and the first cover 13 is mounted along an axial direction of the motor 21. The first control board 24 is placed at a position of the supporting part 113, the first housing 11 is mounted from top to bottom, and finally the second cover 14 is mounted. An assembly sequence of the power head 100 is simple and clear, which facilitates subsequent assembly and can greatly improve subsequent assembly efficiency.

Figure 18:
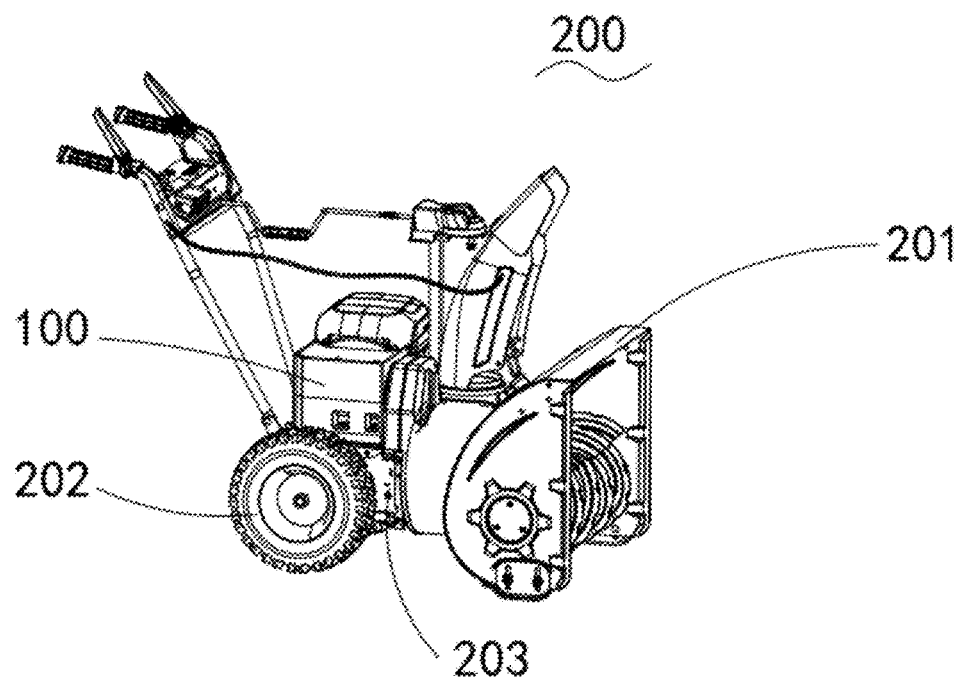
FIG. 18 is a structural schematic view of an outdoor power equipment of the disclosure.

Please refer to FIG. 18. The disclosure further provides an outdoor power equipment 200. The outdoor power equipment 200 includes a main body 203, a working assembly 201, a travelling assembly 202, and a power head 100. The power head 100 is mounted on the main body 203 to provide driving force for the working assembly 201. The power head 100 can be disassembled from the outdoor power equipment 200 as a whole for maintenance and replacement.

Figure 19:
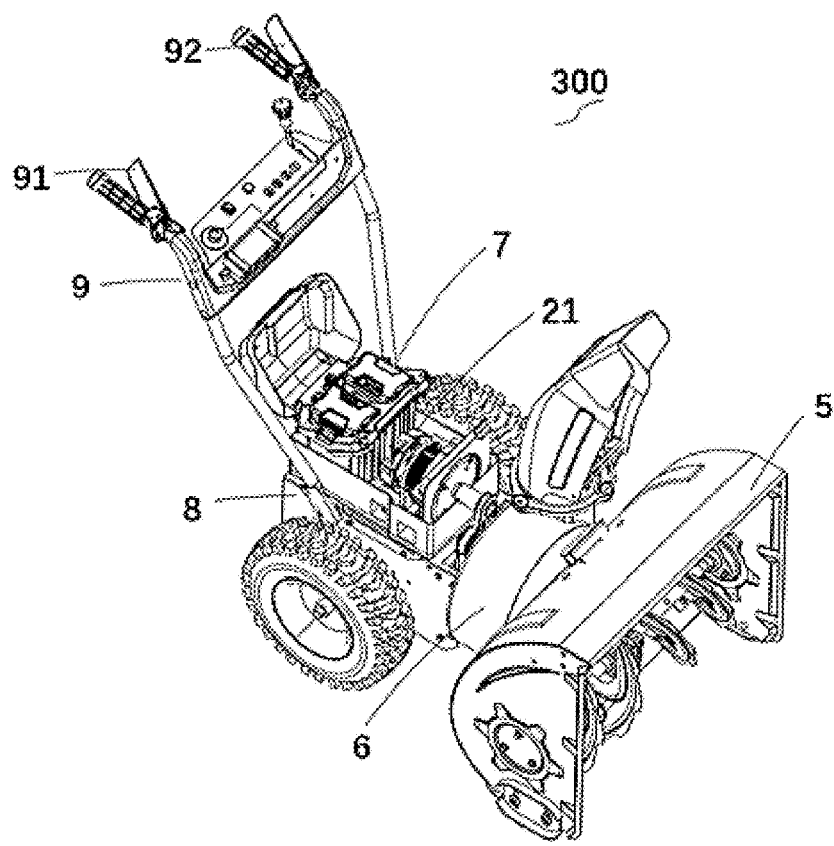
FIG. 19 is a structural view of an entire outdoor power equipment snow thrower of the disclosure.

Please refer to FIG. 19, in other embodiments of the disclosure, the outdoor power equipment 200 may also be a snow thrower 300, and the power head 100 is mounted on the snow thrower 300 to drive the snow thrower 300 to remove snow. The snow thrower 300 may include an auger assembly 5, a snow throwing assembly 6, a power assembly 7, a mainframe body 8 and an operating assembly 9.

Figure 20:
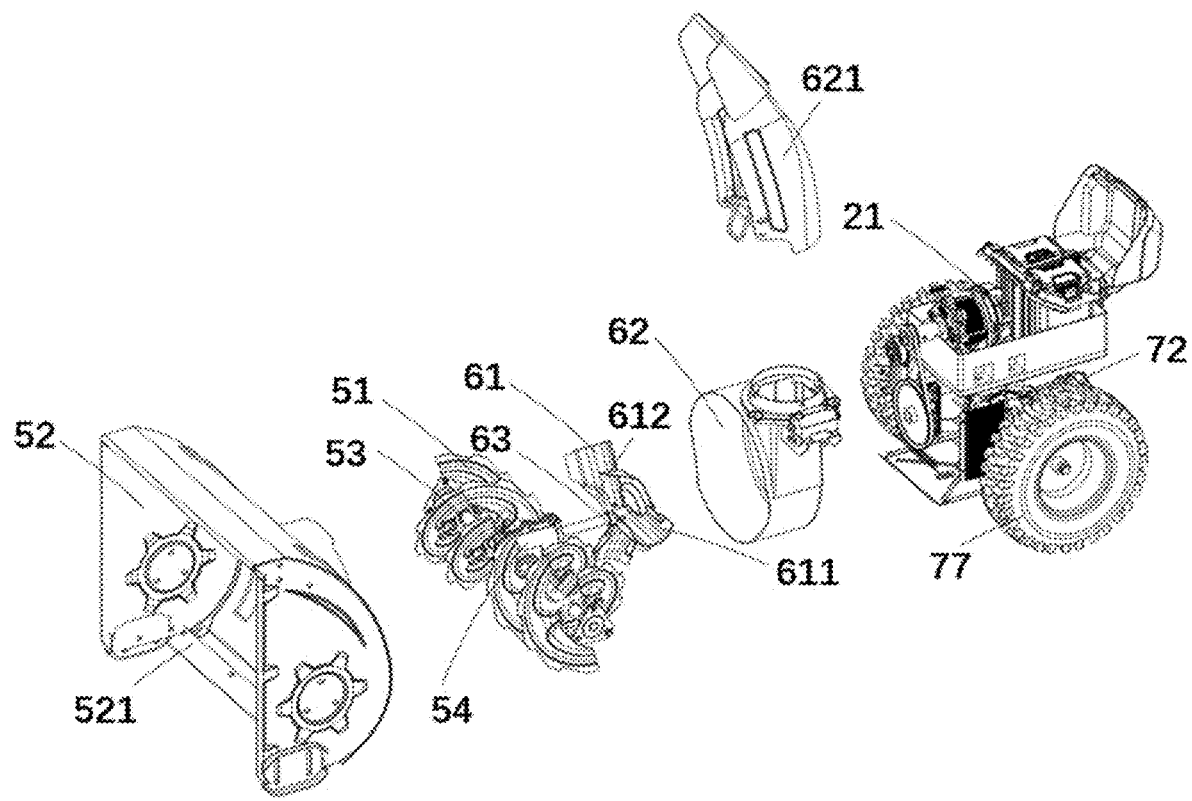
FIG. 20 is a partial structural exploded view of the outdoor power equipment snow thrower of the disclosure.

Please refer to FIG. 20, the auger assembly 5 may include an auger 51 and an auger housing 52. The auger 51 is used to collect snow, and the auger housing 52 is used to house at least part of the auger 51. The snow throwing assembly 6 includes an impeller 61 and an impeller housing 62. The impeller 61 throws the collected snow, and the impeller housing 62 houses at least part of the impeller 61. The auger 51 and the impeller 61 may be metal blades, and the auger housing 52 is in communication with the impeller housing 62.

Please refer to FIG. 20, the snow thrower 300 further includes a first driving shaft 53 and a second driving shaft 63. The first driving shaft 53 extends along a first axis direction, and the second driving shaft 63 extends along a second axis direction. The auger 51 is arranged on the first driving shaft 53, and the first driving shaft 53 is housed in the auger housing 52. The impeller 61 is arranged on the second driving shaft 63, and the second driving shaft 63 is housed in the impeller housing 62. The first driving shaft 53 rotates to drive the auger 51 to rotate, and the second driving shaft 63 rotates to drive the impeller 61 to rotate. Preferably, the first driving shaft 53 is perpendicular to the second driving shaft 63, and a first axis is also perpendicular to a second axis.

Figure 21:
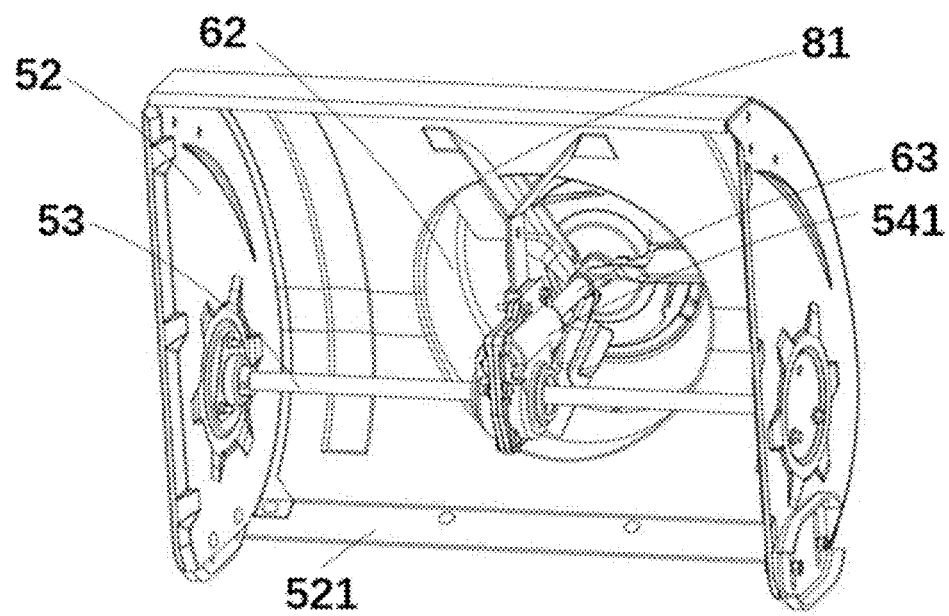
FIG. 21 is a structural schematic view of a snow cavity of the outdoor power equipment snow thrower of the disclosure.

Please refer to FIG. 21, the auger 51 can include multiple sets (for example, at least four sets) of scraper through welding, and is driven by the first driving shaft 53 to rotate, so that snow on the road can be brought into the auger housing 52 for snow collection, and then be thrown from the impeller housing 62. The bottom of the auger housing 52 is provided with a snow shovel blade 521 arranged close to ground for shoveling snow on the ground.

Please refer to FIG. 20, the impeller 61 includes at least one snow throwing blade 611. In an embodiment of the disclosure, the number of snow throwing blades 611 is set to three, for example. A width of one side of the snow throwing blade 611 close to the second driving shaft 63 is smaller than a width of the other side of the snow throwing blade 611, so that a recessing part 612 is defined on the snow throwing blade 611 to facilitate snow entry.

Please refer to FIG. 20, the impeller housing 62 is connected with the snow throwing barrel 621. In this embodiment, the snow throwing barrel 621 is arranged in a tangential direction of a centrifugal force in a rotation direction of the impeller 61, so that the snow in the snow throwing barrel 621 can be thrown out smoothly. Wherein, the impeller 61 can either rotate clockwise or counterclockwise. Accordingly, the snow throwing barrel 621 can be arranged according to a rotation direction of the impeller 61 and requirements of a surrounding environment (throwing snow to an appropriate position), so that the snow can be thrown out smoothly.

Please refer to FIG. 20 and FIG. 21, the snow thrower 300 further includes a first transmission assembly 54. The first transmission assembly 54 connects the second driving shaft 63 and the first driving shaft 53, so as to transmit power from the second driving shaft 63 to the first driving shaft 53. The first transmission assembly 54 includes a plurality of gears (not shown) for transmitting power and a shell 541 for housing the gears. The shell 541 and the auger housing 52 is connected by a fixing rod 81, so as to enhance structural strength.

Figure 22:
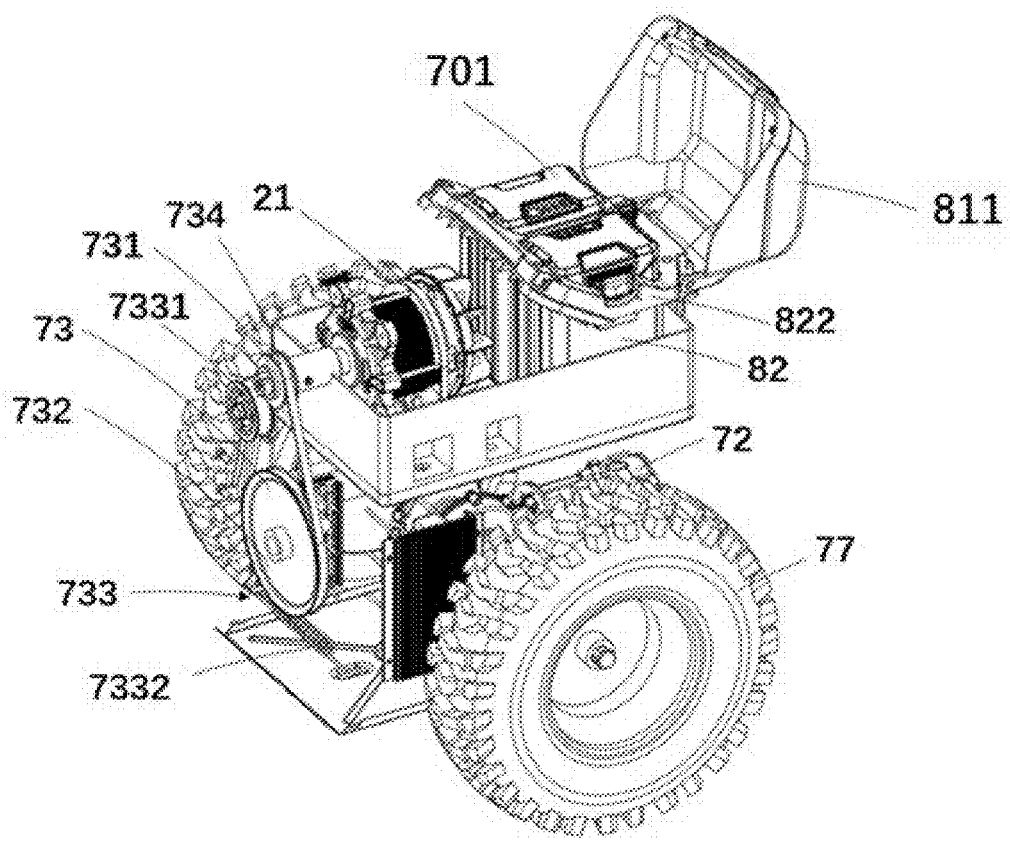
FIG. 22 is a structural schematic view of a power assembly of the outdoor power equipment snow thrower of the disclosure.

Please refer to FIG. 22, the power assembly 7 may include the first motor 21 and a second motor 72. The first motor 21 is used to drive the auger 51 to rotate about the first axis and to drive the impeller 61 to rotate about the second axis. The first axis is perpendicular to the second axis. The second motor 72 is used to drive the snow thrower 300 to move. The power assembly 7 further includes two circuit boards, and the two circuit boards are used to control the operations of the first motor 21 and the second motor 72 respectively. A ratio of a rated output power of the first motor 21 to the second motor 72 ranges, for example, from 0.5 to 50. The rated output power of the first motor 21 may range, for example, from 2000 W to 15000 W. The rated output power of the first motor 21 may range, for example, from 2000 W to 12000 W. The rated output power of the second motor 72 may range, for example, from 300 W to 6000 W. The ratio of the rated output power of the first motor 21 to the second motor 72 may range, for example, from 2.5 to 9. When the snow thrower 300 is working, if the snow is relatively thick, the snow thrower 300 needs to move slowly, and the auger 51 needs to operate quickly to remove thicker snow on the ground. At this time, the output power of the first motor 21 is increased to increase a rotation speed of the auger 51, and at the same time, a moving speed of the snow thrower 300 is reduced, so as to remove snow better and improve snow removal effect. When the snow is relatively thin, the first motor 21 does not need a large output power. At this time, the rotation speed of the auger 51 can be slightly reduced, and the moving speed of the snow thrower 300 can be increased at the same time, which achieves to a better snow removal effect. In order to ensure that the snow thrower 300 can always achieve a better working effect in different working environments, the ratio of the rated output power of the first motor 21 to the second motor 72 of the snow thrower 300 of this embodiment may range, for example, from 2.5 to 9. Within this value range, the snow thrower 300 can adapt to most working environments, and the snow thrower 300 can reasonably distribute energy in most working environments to achieve higher work efficiency and extend working time, which enable the snow thrower 300 to achieve a better working effect. The ratio of the rated output power of the first motor 21 to the second motor 72 can be set to, for example, 6, to adapt to the working environment. The following will test different ratios of the rated output power of the first motor 21 to the second motor 72 of the disclosure, and the obtained data is shown, for example, in Table 1 below.

on an upper end of the mainframe body 8. The pulley assembly 73 includes a first pulley 731, a second pulley 732 and a belt 734. The first pulley 731 is fixed on a motor shaft of the first motor 21, the second pulley 732 is fixed on the second driving shaft 63, and the belt 734 connects the first pulley 731 and the second pulley 732. Power output by the first motor 21 is transmitted to the second driving shaft 63 through the first pulley 731, the belt 734, and the second pulley 732, and then the impeller 61 can be driven to rotate. The pulley assembly 73 further includes a tensioning mechanism 733. The tensioning mechanism 733 includes a tensioning plate (not shown), a tensioning wheel 7331 and an elastic device 7332 respectively arranged on both sides of the tensioning plate. The elastic device 7332 generates a pulling force or a pushing force, so that the tensioning wheel 7331 tensions the belt 734. In other embodiments of the disclosure, the tensioning mechanism 733 may also be with other structures to achieve tensioning of the belt 734. The first motor 21 may be started directly with load, which means that the belt 734 is tensioned by the tensioning mechanism 733; or the first motor 21 may be started at no load, the tensioning mechanism 733 is loosened to relax the belt 734, and then the first motor 21 is idling.

Please refer to FIG. 22, the power assembly 7 further includes a battery pack 701 for supplying power to the first motor 21 and the second motor 72. The battery pack 701 supplies power to the first motor 21 and the second motor 72.

TABLE 1

| Type of electronic control | Ratio of output power | Output power of the first motor | Output power of the second motor | No-load speed of the auger | No-load speed of the impeller | High-gear speed of the second motor |
|---|---|---|---|---|---|---|
| Double electronic control | 2.5 | 4000 W | 1600 W | 6000 rpm | 1500 rpm | 12000 rpm |
| | 3.5 | 3500 W | 1000 W | 5400 rpm | 1400 rpm | 11000 rpm |
| | 6 | 3000 W | 500 W | 4800 rpm | 1300 rpm | 10000 rpm |
| | 9 | 2700 W | 300 W | 3600 rpm | 1150 rpm | 9000 rpm |

| Type of electronic control | Ratio of output power | Range of tire speed | Height of snow removing | Distance of snow throwing | voltage plateau of the battery pack | Duration time of the battery pack |
|---|---|---|---|---|---|---|
| Double electronic control | 2.5 | 0.4~1.2 m/s | 9 m | 12 m | 2*80 V (10 ah) | 15 min |
| | 3.5 | 0.4~1.15 m/s | 8.5 m | 11 m | 2*80 V (8 ah) | 15 min |
| | 6 | 0.4~1.15 m/s | 8 m | 10 m | 2*80 V (8 ah) | 20 min |
| | 9 | 0.4~1.15 m/s | 7.5 m | 9 m | 2*80 V (6 ah) | 15 min |

In Table 1 above, when the ratio of the rated output power of the first motor 21 to the second motor 72 ranges, for example, from 2.5 to 9, the snow thrower 300 can obtain relatively balanced performance and a better working effect. When the rated output power ratio is set to, for example, 6, the snow thrower 300 can obtain a more balanced performance to adapt to most situations. At this time, the snow thrower 300 has a higher working efficiency and a longer working time. A ratio of a rotation speed of the first motor 21 to a rotation speed of the first driving shaft 53 may range, for example, from 2 to 9. The ratio of the rotation speed of the first motor 21 to the rotation speed of the first driving shaft 53 may range, for example, from 2.5 to 9. The rotation speed of the first motor 21 may range, for example, from 1000 rpm to 35000 rpm, and the rotation speed of the first motor 21 may range, for example, from 1250 rpm to 30000 rpm. The rotation speed of the second motor 72 may range, for example, from 1000 rpm to 30000 rpm.

Please refer to FIG. 22, the snow thrower 300 may further include a pulley assembly 73, and the first motor 21 is fixed The battery pack 701 is housed in a battery pack housing 82. The battery pack 701 may be a single battery pack or multiple battery packs. In this embodiment, a double battery pack structure may be adopted. The battery pack housing 82 includes a battery cover 811 and a battery compartment body 822. The battery cover 811 and the battery compartment body 822 jointly define a battery compartment (not labeled) for housing the battery pack 701. Two cavities are formed in the battery compartment, and the double battery packs are respectively mounted in the two cavities.

Please refer to FIG. 19, the snow thrower 300 further includes the operating assembly 9, and the operating assembly 9 is provided with a first switch 91 and a second switch 92. The first switch 91 activates the first motor 21, and the second switch 92 activates the second motor 72. The first switch 91 and the second switch 92 can be arranged in a pressing type, which means that after the first switch 91 is pressed, the first motor 21 is started, and after the first switch 91 is released, the first motor 21 is stopped. After the second switch 92 is pressed, the second motor 72 is started, and after the second switch 92 is released, the second motor 72 is stopped. The first switch 91 and the second switch 92 can start and stop the first motor 21 and the second motor 72.

Figure 23:
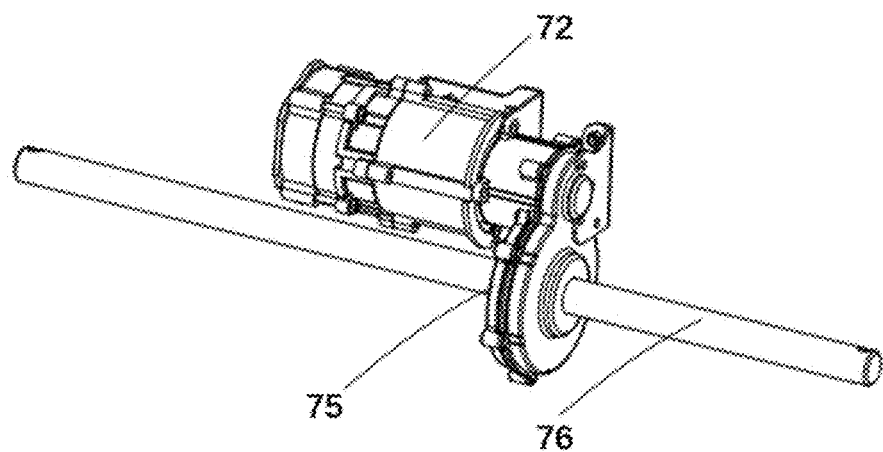
FIG. 23 is a mounting structural view of a motor of the outdoor power equipment snow thrower of the disclosure.
Figure 24:
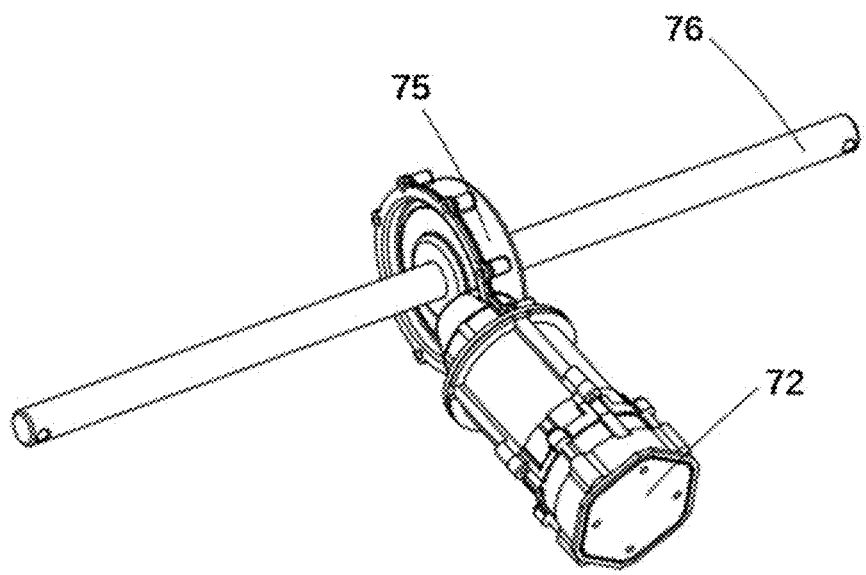
FIG. 24 is another mounting structural view of a motor of the outdoor power equipment snow thrower of the disclosure.

Please refer to FIG. 23 through FIG. 24, the snow thrower 300 further includes a second transmission assembly 75 connected with the second motor 72 and a wheel shaft 76. The wheel shaft 76 is arranged below the mainframe body 8, and wheels 77 are connected to both sides of the wheel shaft 76. The second transmission assembly 75 is used to transmit power output by the second motor 72 to the wheels 77 through the wheel shaft 76 to drive the snow thrower 300 to move. In this embodiment, the second motor 72 may rotate forward or reversely, so that the second transmission assembly 75 and the wheel shaft 76 control a forward or reverse rotation of the wheels 77 to realize a forward or backward movement of the snow thrower 300.

Please refer to FIG. 23 and FIG. 24, a motor shaft of the second motor 72 may be arranged in parallel with the wheel shaft 76 to be driven by a cylindrical gear (not shown), which enables a structure to be compact. In another embodiment of the disclosure, the motor shaft of the second motor 72 may also be arranged perpendicular to the wheel shaft 76 for transmission through a bevel gear (not shown). In other embodiments of the disclosure, the manner in which the second motor 72 drives the wheel shaft 76 to rotate is not limited to the above two structures, but should also include other mounting structures that can make the structure to be more compact.

The disclosure improves the working efficiency of the snow thrower 300 and prolongs the working time, so that the overall power distribution of the snow thrower 300 is more reasonable. In other embodiments of the disclosure, the outdoor power equipment 200 may also be a tool such as a scarifier. The power head 100 of the disclosure integrates the motor assembly 2 and the battery pack assembly 3 to reduce energy consumption. At the same time, the power head 100 has a simple structure, convenient assembly, and good heat dissipation effect.

The above description is only a preferred embodiment of this application and an explanation of the applied technical principles. Those skilled in the art should understand that the scope of disclosure involved in this application is not limited to the technical solutions formed by the specific combination of the above technical features, and should also include other technical solutions formed by any combination of the above technical features or their equivalent features without departing from the above disclosed concept, for example, a technical solution formed by a mutual replacement of the above-mentioned features with the technical features disclosed in this application (but not limited to) with similar functions.

Besides the technical features in the specification, the other technical features are known to those skilled in the art. In order to highlight the innovative features of the disclosure, the rest of the technical features will not be repeated here.

What is claimed is:

1. A power head, used to output power, comprising:
    a housing assembly, comprising a first housing and a second housing, the first housing and the second housing defining a housing space,
    a motor assembly, arranged in the housing space, the motor assembly comprising a motor, one end of an output shaft of the motor extending to outside of the housing assembly,
    a battery pack assembly, arranged in the housing space, the battery pack assembly supplying power to the motor assembly,
    a mounting part, made of metal materials, the motor being arranged in the housing assembly through the mounting part and the mounting part comprising a first mounting portion and a second mounting portion connected with the first mounting portion, and
    a base, made of insulating materials, connected to a bottom of the second housing, located outside of the housing assembly, and the first mounting portion being arranged between the second housing and the base.

2. An outdoor power equipment, comprising:
    a main body,
    a working assembly, connected with the main body,
    a travelling assembly, connected with the main body, and
    a power head, mounted on the main body, the power head comprising:
    a housing assembly, comprising a first housing and a second housing, the first housing and the second housing defining a housing space,
    a motor assembly, arranged in the housing space, the motor assembly comprising a motor, one end of an output shaft of the motor extending to outside of the housing assembly, and
    a battery pack assembly, arranged in the housing space, the battery pack assembly supplying power to the motor assembly, wherein
    the motor is arranged in the housing assembly through a mounting part, and the mounting part comprises a first mounting portion,
    the power head further comprises a base,
    the first mounting portion is provided with a first mounting hole, the base is provided with a second mounting hole and a first protruding part, and when the base is assembled with the second housing, the first protruding part passes through the first mounting hole and is inserted into the second housing.

3. A power head, used to output power, comprising:
    a housing assembly, comprising a first housing and a second housing, the first housing and the second housing defining a housing space,
    a motor assembly, arranged in the housing space, the motor assembly comprising a motor, one end of an output shaft of the motor extending to outside of the housing assembly, and
    a battery pack assembly, arranged in the housing space, the battery pack assembly supplying power to the motor assembly, wherein
    the motor is arranged in the housing assembly through a mounting part, and the mounting part comprises a first mounting portion,
    the power head further comprises a base,
    the first mounting portion is provided with a first mounting hole, the base is provided with a second mounting hole and a first protruding part, and when the base is assembled with the second housing, the first protruding part passes through the first mounting hole and is inserted into the second housing.

4. The power head according to claim 3, wherein the mounting part comprises a second mounting portion connected with the first mounting portion.

5. The power head according to claim 4, wherein the motor is connected with the second mounting portion, and the second mounting portion is provided with a through hole for the output shaft of the motor to pass through.

6. The power head according to claim 5, wherein the base is connected to a bottom of the second housing, and the first mounting portion is arranged between the second housing and the base.

7. The power head according to claim 4, wherein the motor assembly further comprises a casing, the casing is arranged outside the motor, one end of the casing is connected with the second mounting portion, a tail end of the motor is provided with a first fan, and the first fan is located inside the casing.

8. The power head according to claim 3, wherein the housing assembly is provided with a first cavity and a second cavity, the motor assembly is arranged in the first cavity, the battery pack assembly is arranged in the second cavity, the first housing and the second housing surround and define the first cavity, and the second cavity is opened on the first housing.

9. The power head according to claim 3, wherein the housing assembly further comprises a second cover that connects the first housing with the second housing.

10. The power head according to claim 9, wherein the motor assembly comprises a first control board, the first housing and the second housing are provided with a supporting part, and the first control board is arranged between the supporting part and the second cover.

11. The power head according to claim 3, wherein the second housing is provided with a connection part, and the second housing is connected with the base through the connection part.

12. The power head according to claim 11, wherein the connection part is recessed toward an inside of the second housing.

13. The power head according to claim 12, wherein the housing assembly is provided with an air inlet and an air outlet, the air outlet is arranged at the connection part of the second housing, and the air outlet is open toward a side of the housing assembly.

14. The power head according to claim 13, wherein the motor assembly further comprises a second fan arranged on the output shaft of the motor.

15. The power head according to claim 14, wherein the housing assembly further comprises a first cover, and the first cover is provided with a central hole for the output shaft of the motor to pass through.

16. The power head according to claim 15, wherein the second fan is located between the first cover and the second mounting portion.

17. The power head according to claim 16, wherein the first cover is provided with a second protruding part, and a bearing for the output shaft of the motor to pass through is arranged in the second protruding part.

18. The power head according to claim 17, wherein the second mounting portion is provided with an internal vent, and air flowing through an inside of the motor flows into a space defined by the first cover and the second mounting portion through the internal vent.

19. The power head according to claim 18, wherein the second mounting portion is further provided with an external vent, and the external vent is located at a periphery of the internal vent.

20. The power head according to claim 16, wherein the first cover is attached to the second mounting portion to define a volute-like structure, the volute-like structure is provided with a port, and the port is connected with the air outlet to guide airflow to the air outlet.

* * * * *